(12) United States Patent
Fromm

(10) Patent No.: US 9,386,196 B1
(45) Date of Patent: Jul. 5, 2016

(54) HOLDING ASSEMBLY FOR A PICTURE TAKING DEVICE

(71) Applicant: Wayne G. Fromm, Toronto (CA)

(72) Inventor: Wayne G. Fromm, Toronto (CA)

( * ) Notice: Subject to any disclaimer, the term of this patent is extended or adjusted under 35 U.S.C. 154(b) by 0 days.

(21) Appl. No.: 14/588,218

(22) Filed: Dec. 31, 2014

(51) Int. Cl.
| | |
|---|---|
| *H04N 5/225* | (2006.01) |
| *F16M 13/02* | (2006.01) |
| *F16B 45/00* | (2006.01) |
| *F16B 7/14* | (2006.01) |
| *F16B 7/10* | (2006.01) |
| *G03B 17/56* | (2006.01) |
| *H04N 5/44* | (2011.01) |

(52) U.S. Cl.
CPC ............... *H04N 5/2252* (2013.01); *F16B 7/10* (2013.01); *F16B 7/14* (2013.01); *F16B 45/00* (2013.01); *F16M 13/022* (2013.01); *G03B 17/561* (2013.01); *H04N 5/44* (2013.01)

(58) Field of Classification Search
CPC ..... H04N 5/2252; H04N 5/44; F16M 13/022; G03B 17/561; F16B 7/10; F16B 45/00; F16B 7/14
USPC ........................................................ 348/373
See application file for complete search history.

(56) References Cited

U.S. PATENT DOCUMENTS

| | | | | |
|---|---|---|---|---|
| 5,538,212 | A * | 7/1996 | Kennedy ................ | F16M 13/02 396/428 |
| 8,152,389 | B1 * | 4/2012 | Lammens .............. | F16M 11/10 396/419 |
| 2004/0211868 | A1 * | 10/2004 | Holmes .................. | F16M 11/40 248/231.71 |
| 2010/0214469 | A1 * | 8/2010 | Duncan .................. | F16M 11/04 348/373 |
| 2012/0120236 | A1 * | 5/2012 | Xiao ..................... | H04N 5/2251 348/143 |
| 2012/0154988 | A1 * | 6/2012 | Wessells ................ | F16M 11/40 361/679.01 |

* cited by examiner

*Primary Examiner* — Gevell Selby
(74) *Attorney, Agent, or Firm* — Vincent G. LoTempio; Kloss, Stenger & LoTempio; David T. Stephenson

(57) ABSTRACT

A holding assembly for a picture taking device such as a smartphone or camera, which holding assembly may be hung from various surfaces to position the picture taking device at eye level, the holding assembly including variable length rigid support having first and second ends, which variable length rigid support may be readily locked in various positions of length adjustment, the one end of the variable length rigid support being provided with a griping surface which may act as a handle, a C-shaped hook which extends upwardly from the first end of the variable length rigid support, and a removable ball joint assembly carried by the second end of the variable length rigid support, which ball joint assembly may receive the picture taking device.

9 Claims, 8 Drawing Sheets

HOLDING ASSEMBLY FOR A PICTURE TAKING DEVICE

TECHNICAL FIELD

The present invention relates to a holding assembly for a picture taking device such as a camera or smartphone, and more particularly to such a holding assembly having a rigid support having means at one end for supporting a picture taking device, a handle at the other end of the support, and suspension structure carried by an end of the support for supporting the rigid support and the picture taking device on a suitable surface such as a molding, picture frame, etc. so that the picture taking device my be positioned at eye level of the user or at a desired variable angle. The suspension structure is preferably in the form a C-shaped hook, and is designed so that it may be releasably attached without damaging the surface which provides the gravitational support to steady the picture taking device.

BACKGROUND OF THE INVENTION

Hand held supporting devices for cameras and the like are well known in the art, typical examples being shown in U.S. Pat. Nos. 7,684,694 and 8,757,901 and in US published patent application 2008/0117328. These supporting devices are useful in many situations. However they have disadvantages either when it is desired to position the picture taking device at a greater distance than is practical with the supporting structure, or when it is desired to have the picture taking device carried by a stationary support to eliminate shake. Thus, it takes some time to set picture taking devices on tripods, and also in some situations there may be no support for the tripod.

It is also well know to provide supports for the purpose of securing a picture taking device to a stationary object, such as a tree, post or stump, which such supports are fastened to a tree or the like. Examples of such securing devices are shown in US published applications 2009/0010637 and 2011/0116782.

OBJECTS AND SUMMARY OF THE INVENTION

It is an object of this invention to provide a support where a picture taking device may normally be supported on a hand-held rigid support having variable lengths, which support may be hung on practically any stationary structure without damage to the stationary structure, and the support being adjustable in length so that the picture taking device is positioned at eye level. To this end one end the support is provided with removable ball joint/camera mount assembly. The ball-joint mount assembly may receive a smartphone or a camera. The other end of the support is provided with an adapter, which can be removed when desired. The adapter is in the form of a hook, preferably a flat hook which may be formed of sheet metal or the like. The adapter can be either located adjacent a handle or grip, or alternatively it may be located adjacent to a ball joint assembly mounted at one end of the rigid support as shown in the following FIG. 2. Alternatively it may be located adjacent to a ball joint assembly mounted directly to a non-extendable rigid support as shown in the following FIG. 9.

The above object and other objects and advantages of this invention should become apparent to those skilled in the arts after a consideration of the following detailed description taken in conjunction with the following drawings.

DETAILED DESCRIPTION

A photographer could be at a party in a hotel room, in a backyard, at a tailgate party or the like and wants to be included in a selfie or a group photograph or video and wants more background than a handheld camera would provide. This problem could be overcome by the use of a tripod, but the photographer may not have a tripod to mount the picture taking device, or even if he has a tripod he may lack the surface on which to mount the tripod. In addition he may not have the time to set-up a tripod mounted device. The solution to this problem is achieved by the present invention which includes as its principal components a rigid support having variable lengths, which support has a hook at one end, and a ball joint assembly mounted on the other end to which a picture taking device may be secured. Alternatively the present invention may include a rigid support which may have different lengths, the support having a ball joint at one end which may support a picture taking device and a further ball joint assembly at the other end to which a suspension structure may be secured. The shutter of the picture taking device can be triggered by a timer, remote control, a voice command, or it can be set to operate in a continuous mode. In addition, new camera and smartphones automatically sense the orientation and produces right side up image for the person to use the screen display for centering.

Figure 1:
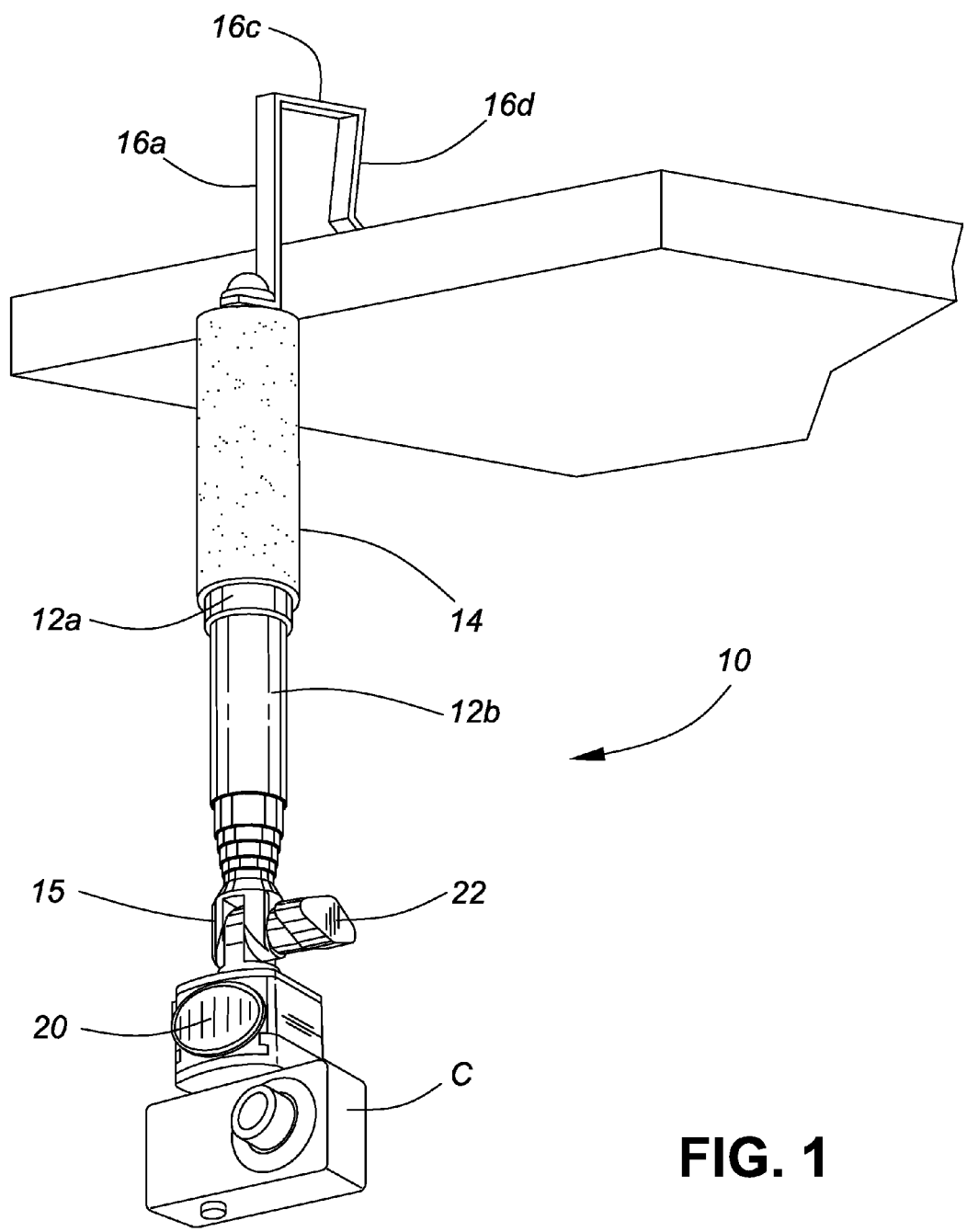
FIG. 1 is a perspective view showing the holding assembly of this invention when hooked to a board, the holding assembly including a rigid assembly shown in a retracted position, the rigid assembly carrying a camera secured to a ball joint assembly and also carrying at the other end a suspension structure in the form of a hook.
Figure 2:
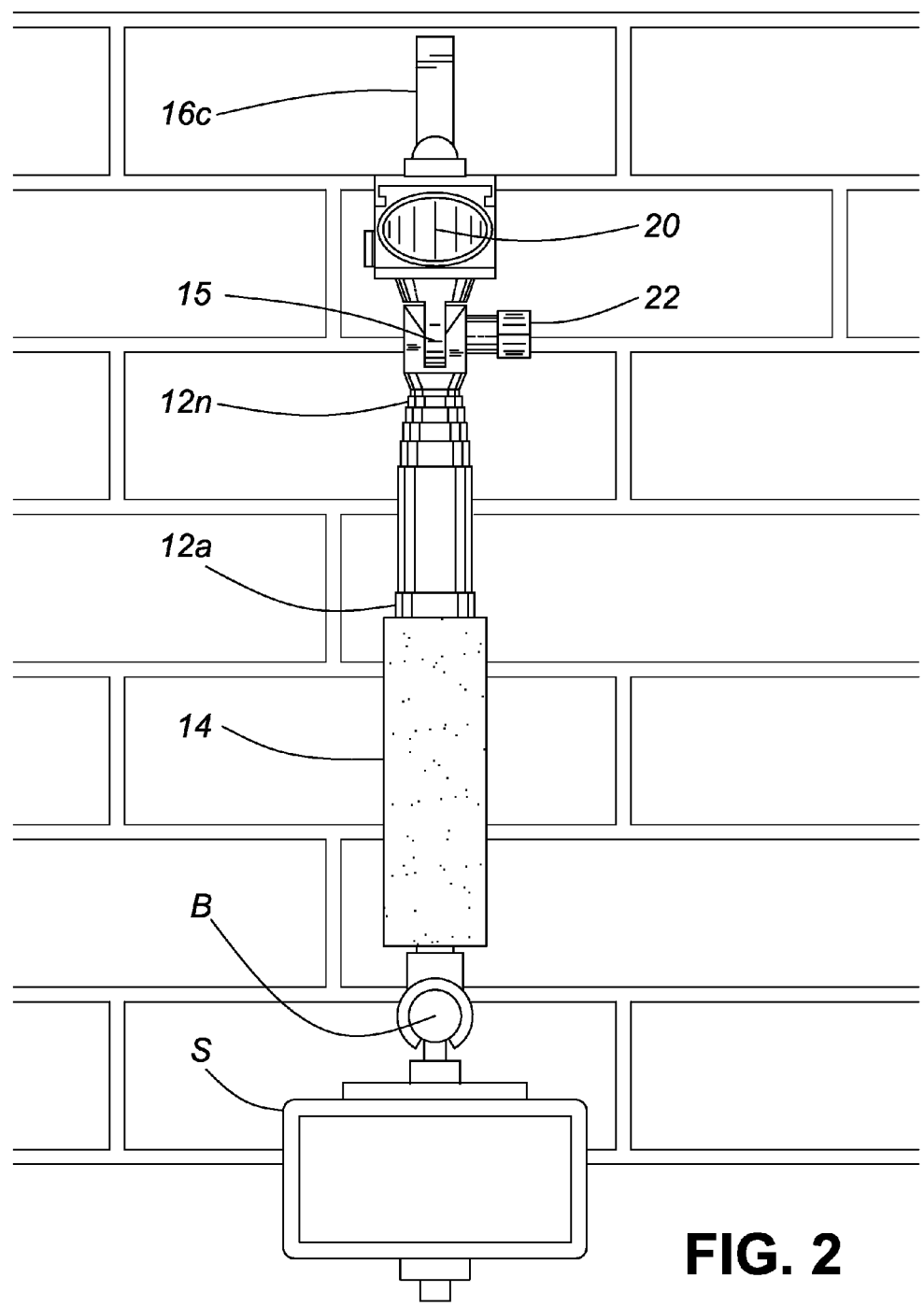
FIG. 2 is a front view showing the holding assembly of this invention hung from the top surface of a brick in a brick wall, the holding assembly being in a substantially retracted position and carrying a smartphone. In this view parts are reversed with the ball joint assembly being secured adjacent the handle, and the suspension structure being carried by a further ball joint assembly adjacent the other end.
Figure 3:
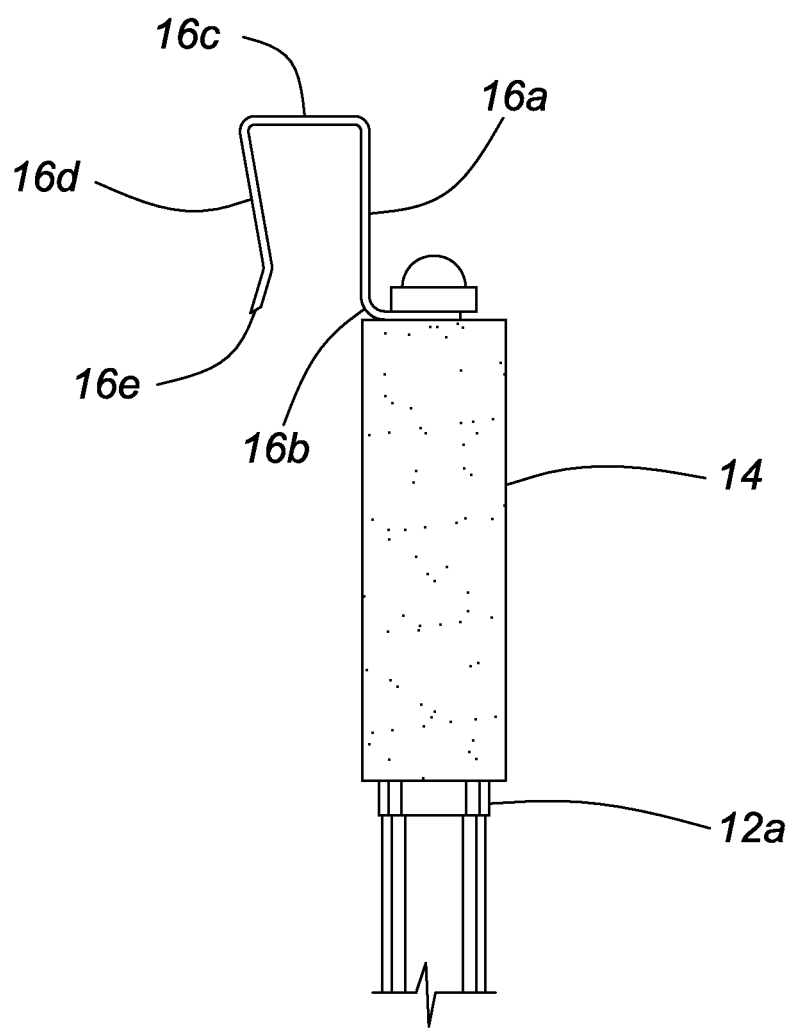
FIG. 3 is a side view of a portion of the holding assembly shown in FIG. 1, and showing the hook.

With reference now to the various figures, the holding assembly of this invention is indicated generally at 10 is provided for carrying either a camera "C", a smartphone "S", or any other picture taking device. The holding assembly is preferably formed of a rigid support having rod-like telescoping units 12a, 12b . . . 12n which may be locked in various positions of length adjustment. The rigid rod-like telescoping assembly has spaced apart first and second ends. As shown in the various views, the telescoping unit 12a is of the largest diameter, and it is provided with a grip or handle 14. The other end 12n is provided with removable ball joint assembly 15. In the embodiment shown in FIG. 1 a picture taking device such as a camera "C" is secured to the ball joint assembly. As shown in FIG. 1, a C-shaped hook as shown at 16, which may formed from sheet metal, plastic, or the like, may be releasably secured to the handle portion 12a of the support 10, as by a screw which may be hand tightened. Alternatively the C-shaped hook may be secured to the ball joint assembly as shown in FIG. 2. The C-shaped hook has a first vertically extending section 16a provided with a lower horizontal tab portion 16b which may be secured to the first end of the rigid telescoping sections which first end will become the upper end when the support is placed in its normal operating position as shown in various figures. The C-shaped hook is also provided with an upper transverse section 16c, and a downwardly extending section 16d secured to the upper transverse section and spaced away from the and generally parallel to the vertically extending section 16a. The downwardly extending section 16d is provided with an elongated lower contact surface 16e which is horizontal when in the normal operating position as shown in the drawings and which surface may be placed on virtually any horizontal structure to hold the support of this invention. The tail of the hook in 16e is very important, the thinner the better as it has to grip mortar on brick walls and behind thin spaces, and thus it may have a chisel shape.

In the FIG. 2 embodiment the handle is used to grip the holding assembly, pushing the apparatus skyward and unhooking it from the overhead support surface. In the FIG. 1 embodiment the picture taking device or the ball joint assembly is grasped by the user to push the holding assembly upwardly to release the C-shaped hook from the surface which it is engaging.

FIG. 1 shows the support 10 of this invention having a light weight camera "C secured to a ball joint assembly 15 which in turn is secured to one end of a variable length rigid support 12, the other end of the support carrying a C-shaped hook 16 which in turn may engage various surfaces, such as the top surface of a board as shown in FIG. 1. As shown the variable length rigid support is formed of telescoping segments which may be locked in various length positions. The rigid telescoping assembly has first and second ends, each of which is preferably provided with screw threaded apertures which may received various fasteners, such as a stud carried by the ball joint assembly.

Figure 4:
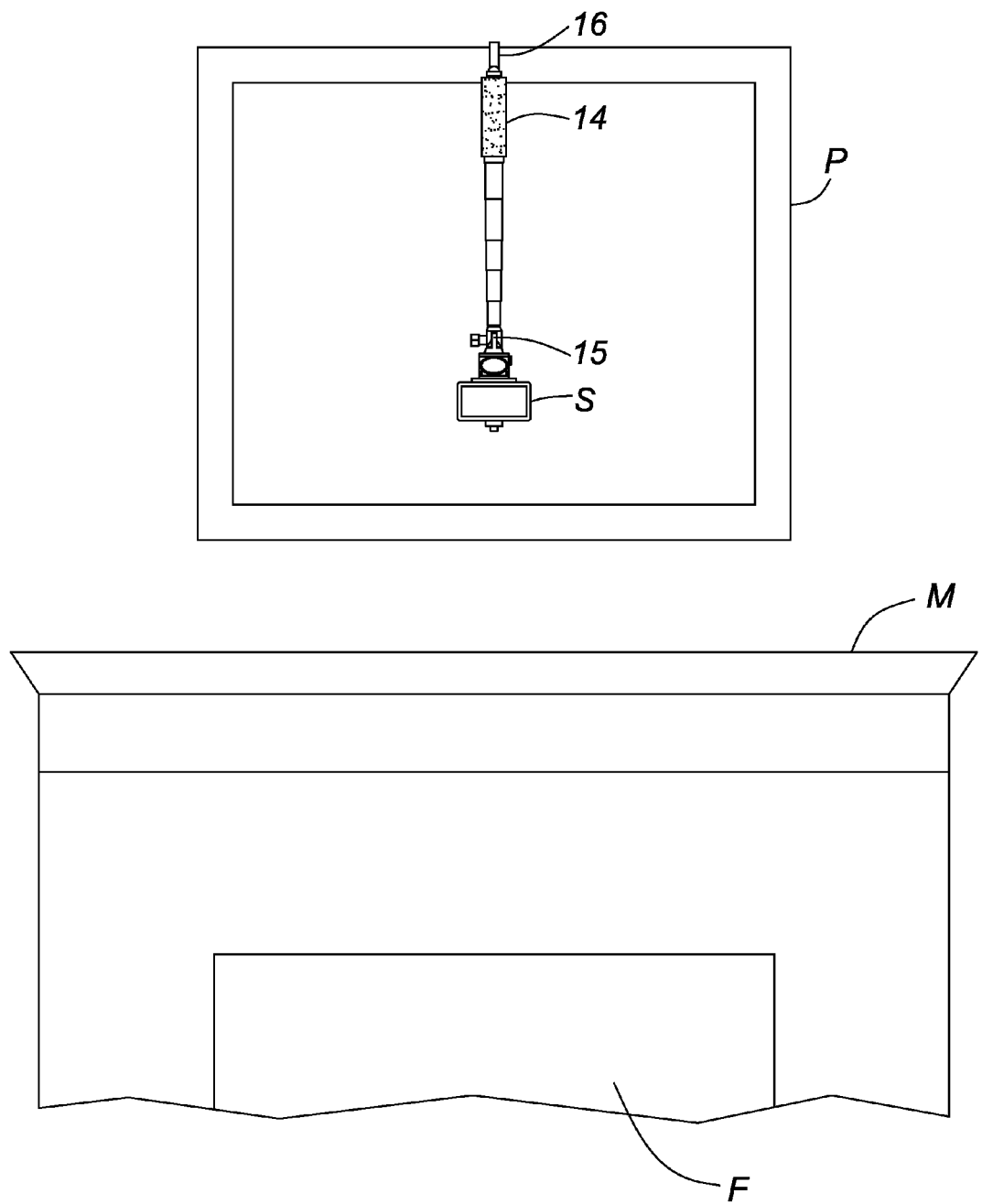
FIG. 4 shows the holding assembly of this invention in an extended position, the holding assembly being hooked to the top of picture frame and being partially extended to position the carried smartphone near eye level.

The ball joint assembly may be of differing designs, particularly one adapted to receive camera as shown in FIG. 1, or alternatively smartphones as shown in FIGS. 2 and 4. Each of the ball joint assemblies includes a first portion which is secured to an end of the rigid support as for example via a stud which is received in a threaded aperture at the end of the rigid support. The ball joint assembly is also provided with a second portion which may be locked in various positions of adjustment via knob 22. The second portion is provided with a mirror 20 so the user can see what the camera or smartphone will capture as an image.

Figure 5:
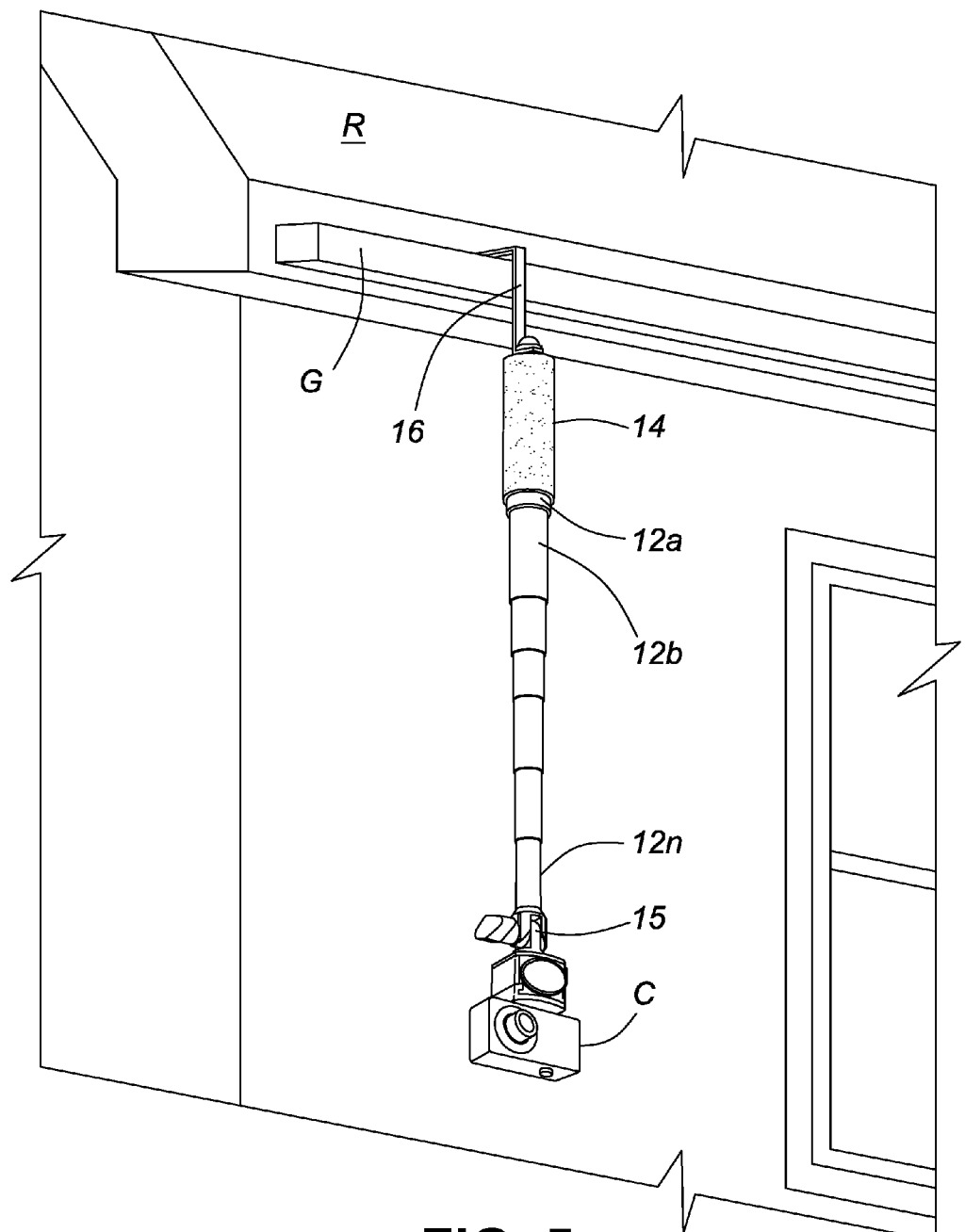
FIG. 5 shows the holding assembly of this invention hooked to a rain gutter and being extended to such a length that the picture taking device is at about eye level.

FIG. 2 shows the manner in which the support for a picture taking device can be mounted on a relatively flat surface. In this view the contact surface 16e engages to top surface of a brick in a brick wall. While not shown, the contact surface may engage a variety of other surfaces, such as tree bark, wall and car moldings, etc. FIG. 4 shows the C-shaped hook engaging the top of a picture frame "P" which may above a mantle "M" over a fireplace "F". In FIG. 5 the hook is shown engaging a gutter "G" below a roof "R".

Figure 6:
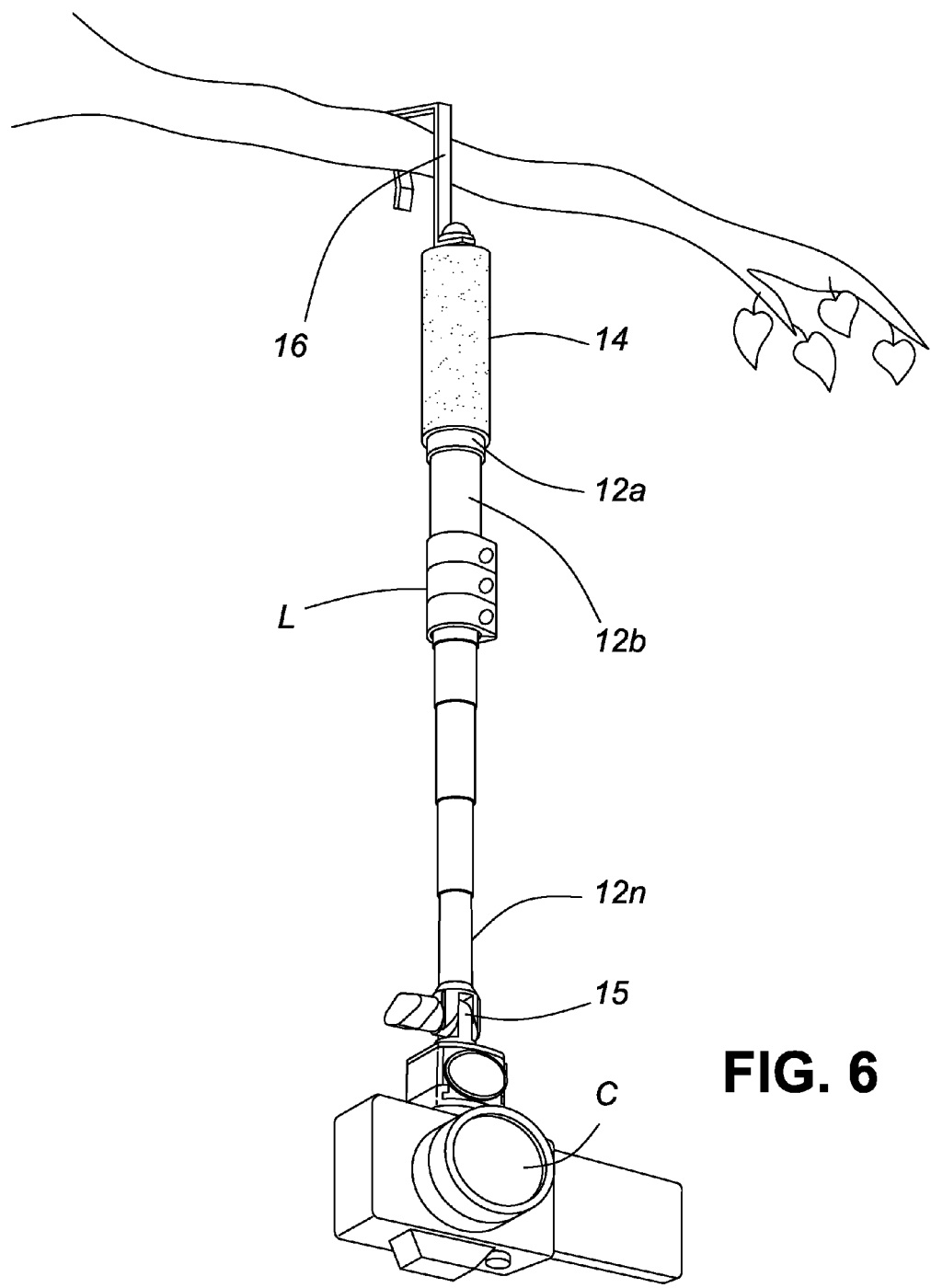
FIG. 6 shows the holding assembly of this invention carried by a tree branch, the holding assembly including a rigid telescoping support which is provided with latched for holding the telescoping support.

FIG. 6 shows a holding assembly where the telescoping rigid support 12a, 12b . . . 12n has latches "L" which are used to secure the telescoping portions from sliding. This variation is desired when using a heavy picture taking device such as a DSLR.

Figure 7:
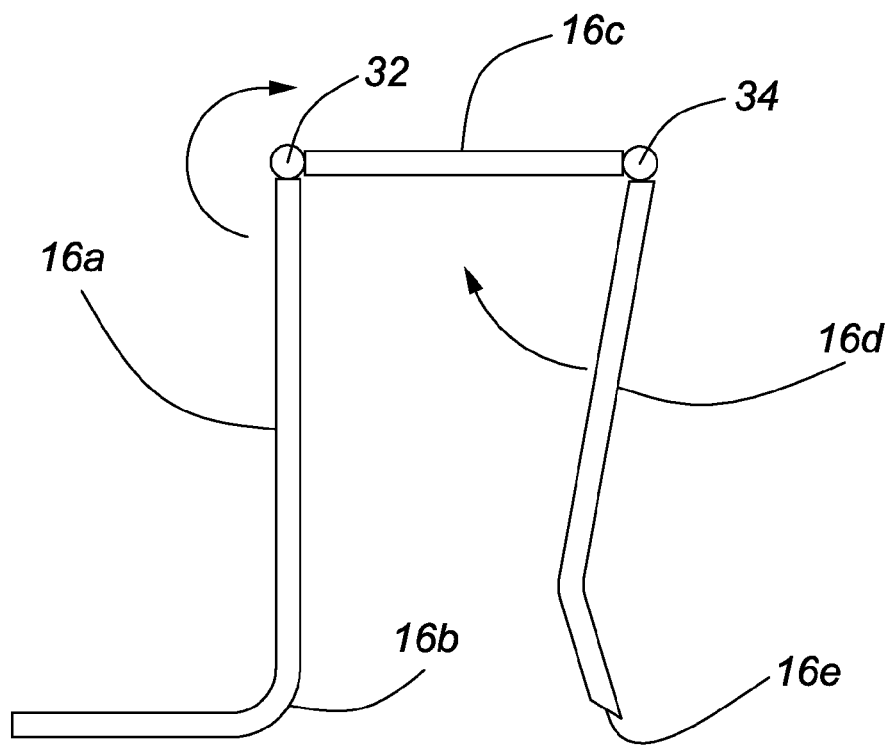
FIG. 7 shows variation of the suspension structure where hinges are provided to permit the suspension structure to be folded.
Figure 8:
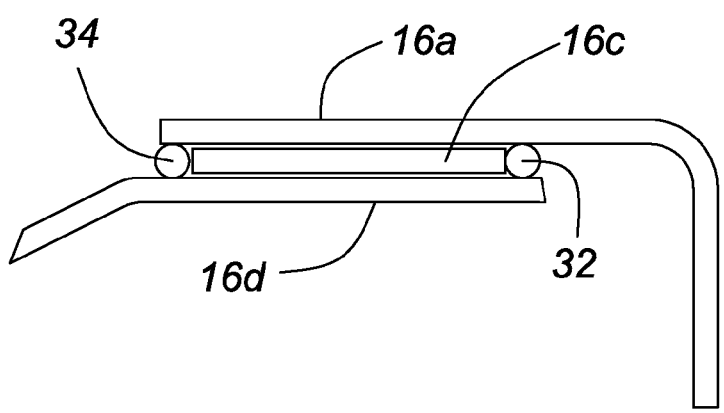
FIG. 8 shows the suspension structure in a fully folded condition.

One embodiment of the hook 16 as shown in FIGS. 7 and 8 will have hinges to allow the hook to fold for transport. Thus there will be a first hinge 32 between sections 16a and 16c, and a further hinge 34 between sections 16c and 16d. To fold the hook for transport, section 16a will initially be folded onto section 16c, and then section 16d will be folded under section 16c as shown in FIG. 8.

Figure 9:
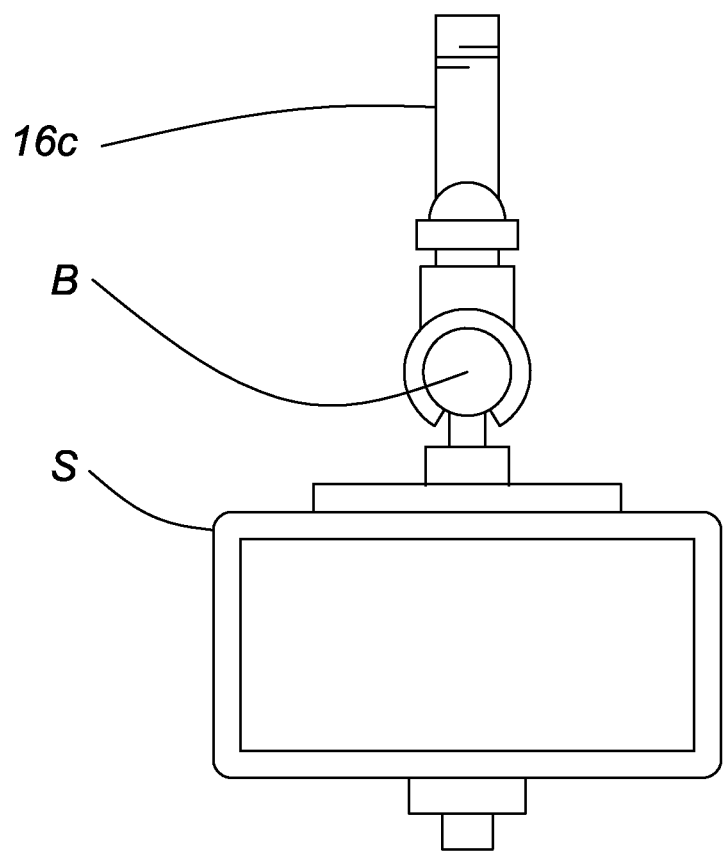
FIG. 9 is a view similar to FIG. 2, but showing the various parts of this invention without the rigid rod-like support and the upper ball joint assembly.

This apparatus can further be used to provide near instantaneous mounting, without damage to any surface, of a picture taking device for surveillance and/or monitoring of an area or for personal viewing of a video such as one might do on a train by mounting the apparatus on the back of the seat in front of the person using it. This feature is shown in FIG. 9 which to a certain extent corresponds to FIG. 2, except that there is no requirement for the elongated rigid support having variable lengths, nor is there a requirement for the upper ball joint assembly 15.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A holding assembly for a picture taking device such as a smartphone or light weight camera, which holding assembly may be releasably attached to various surfaces to position the picture taking device at eye level, the holding assembly comprising: a rigid support having first and second ends, which support may be varied in length; a hook which is carried by the first end of the rigid assembly; and a removable joint assembly carried by the second end, which joint assembly may receive a picture taking device, wherein the joint assembly is a ball joint assembly; wherein a further ball joint assembly is provided, the further ball joint assembly being located between the first end of the rigid support and the hook.

2. The holding assembly as set forth in claim 1 wherein the rigid support is formed of telescoping links which may positioned in various lengths.

3. The holding assembly as set forth in claim 2 further including latches carried by the telescoping links to hold the telescoping links in their desired positions of adjustment.

4. The holding assembly as set forth in claim 1 wherein the hook has an elongated edge for engaging various surfaces.

5. The holding assembly as set forth in claim 1 wherein the hook is provided with a thin tail so it can better grip mortar on brick walls and behind thin spaces.

6. The holding assembly as set forth in claim 1 wherein the rigid support is provided with a handle adjacent one of its ends.

7. The holding assembly for a picture taking device as set forth in claim 1 wherein the parts may be releasably attached to a support without damaging the surface which provided the gravitational support to steady the picture taking device.

8. The holding assembly as set forth in claim 1 wherein the hook is formed of sheet metal.

9. A holding assembly for a picture taking device such as a smartphone or light weight camera, which holding assembly may be releasably attached to various surfaces to position the picture taking device at eye level, the holding assembly comprising: a rigid support having first and second ends, which rigid support is formed of telescoping sections which may be readily locked in various positions of length adjustment, one end being provided with a griping surface which may act as a handle; a C-shaped hook interconnected with the first end of the rigid support, the hook having a first relatively flat section which extends upwardly from the first end of the rigid support when the holding assembly is in its normal operating position, a second flat section which extends transversely away from the top of the first section, and a third flat section extending downwardly from the end of the second flat section which is spaced away from the first section, and which is provided with an elongated lower contact surface which is horizontal when in the normal operating position; and a removable ball joint assembly carried by the second end of the rigid support, which ball joint assembly may receive the picture taking device, wherein the joint assembly is a ball joint assembly; wherein a further ball joint assembly is provided, the further ball joint assembly being located between the first end of the rigid support and the hook.

\* \* \* \* \*